US008655013B2

(12) United States Patent
Sipe

(10) Patent No.: US 8,655,013 B2
(45) Date of Patent: Feb. 18, 2014

(54) VIRTUAL REMOTE ENCODING SYSTEM

(75) Inventor: Stanley W. Sipe, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 295 days.

(21) Appl. No.: 13/089,384

(22) Filed: Apr. 19, 2011

(65) Prior Publication Data

US 2011/0286626 A1 Nov. 24, 2011

Related U.S. Application Data

(60) Provisional application No. 61/345,806, filed on May 18, 2010.

(51) Int. Cl.
*G06K 9/00* (2006.01)

(52) U.S. Cl.
USPC .......... 382/101

(58) Field of Classification Search
USPC .......... 382/101
See application file for complete search history.

(56) References Cited

U.S. PATENT DOCUMENTS

| | | | | |
|---|---|---|---|---|
| 5,910,998 | A * | 6/1999 | Yui | 382/101 |
| 6,539,098 | B1 * | 3/2003 | Baker et al. | 382/101 |
| 2002/0029153 | A1 * | 3/2002 | Lee et al. | 705/1 |
| 2002/0172399 | A1 * | 11/2002 | Poulin et al. | 382/101 |
| 2004/0139033 | A1 * | 7/2004 | Amato | 705/400 |

* cited by examiner

*Primary Examiner* — Tom Y Lu

(57) ABSTRACT

Mail processing methods and systems. A method performed at a local delivery unit includes receiving an image of a mail item at the local delivery unit from an imaging and virtualization facility (IVF) that is geographically separated from the local delivery unit. The image and the mail item are associated with a mail item identifier. The method includes displaying the image to a user at the local delivery unit and receiving address information corresponding to the mail item from the user. The method includes associating the address information with the mail item identifier. Related apparatuses and systems are discussed.

20 Claims, 4 Drawing Sheets

VIRTUAL REMOTE ENCODING SYSTEM

CROSS-REFERENCE TO RELATED APPLICATION

This application claims the benefit of the filing date of U.S. Provisional Patent Application 61/345,806, filed May 18, 2010, which is hereby incorporated by reference.

TECHNICAL FIELD

The present disclosure is directed, in general, to mail and parcel processing techniques.

BACKGROUND OF THE DISCLOSURE

Improved and more efficient postal processing systems are desirable.

SUMMARY OF THE DISCLOSURE

Various disclosed embodiments include mail processing methods and systems. A method performed at a local delivery unit includes receiving an image of a mail item at the local delivery unit from an imaging and virtualization facility (IVF) that is geographically separated from the local delivery unit. The image and the mail item are associated with a mail item identifier. The method includes displaying the image to a user at the local delivery unit and receiving address information corresponding to the mail item from the user. The method includes associating the address information with the mail item identifier.

Another embodiment includes a method performed by one or more data processing systems at an imaging and virtualization facility. The method includes receiving an image of a mail item and determining that a destination address of the mail item cannot be fully determined automatically. The method includes identifying a destination local delivery unit corresponding to the mail item, and sending an image of a mail item to the local delivery unit. The IVF is geographically separated from the local delivery unit, and the image and the mail item are associated with a mail item identifier. The method includes receiving address information corresponding to the mail item from the local delivery unit and associating the address information with the mail item identifier.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
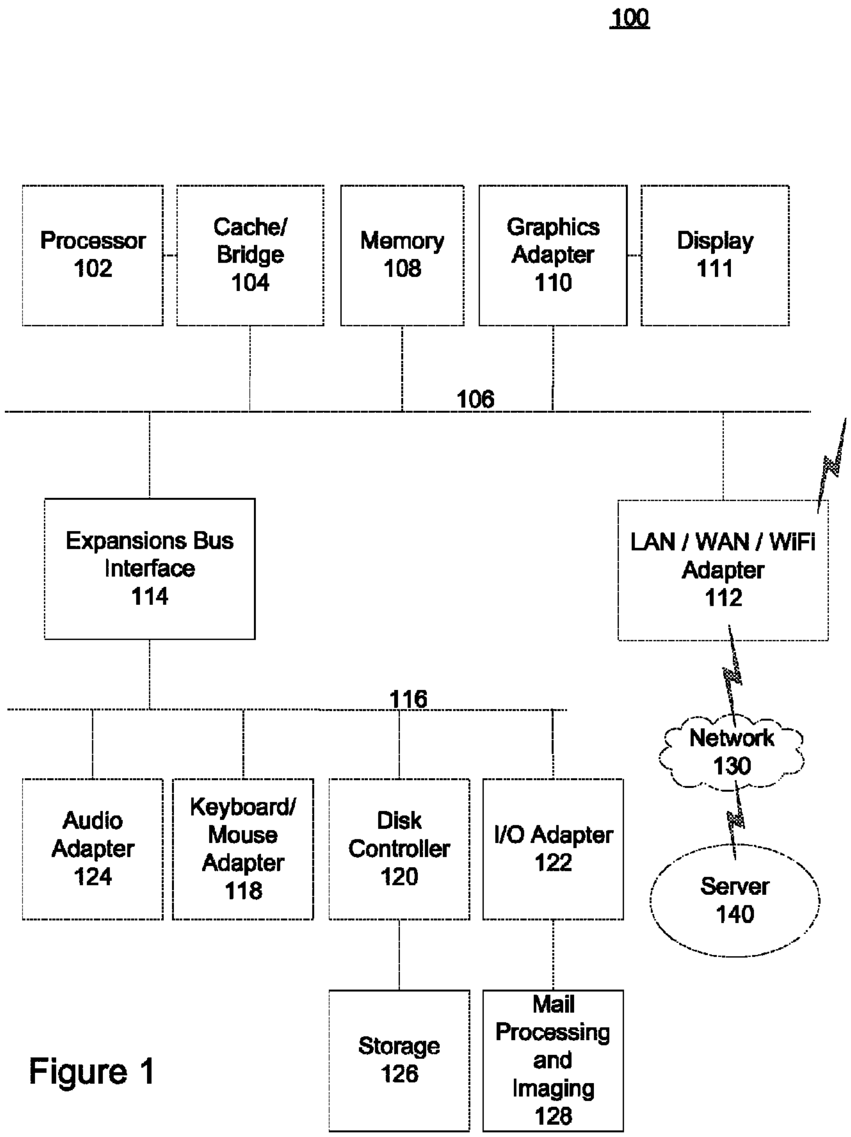
FIG. 1 depicts a block diagram of a data processing system in which an embodiment can be implemented.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Current postal address processing has concentrated on the processing of mail items on high speed mail processing equipment. At selected periods of the day, typically early afternoon and early evening, the mail items are aggregated from the various collection routes and transferred via truck from the local post office to the centralized processing facility. At the facility, the larger packages are routed to parcel sorting equipment. The letter sized and larger letters, referred to as flat items or flats, are routed to automated systems that preprocess the items into two mail streams—letters and flats. The letters typically continue on through a machine that automatically orients the items according to the indicia, applies an identification code and then images the address surface. The image is then processed via OCR technology. A percentage of the mail items that are imaged cannot be resolved to the finest level to enable them to be processed to the specific delivery point required for automated carrier sequencing of the mail pieces.

These images are sent to video coding operators to enable the images to be keyed and resolved by additional address directory searching. This automated recognition and keying operations occur asynchronously as different images take differing amounts of time and the volume of images and available number of keying personnel may result the processing being delayed for a significant period of time. In the United States Postal Service (USPS), the keying operations are performed at centralized Remote Encoding Centers (RECs). Currently the USPS processes approximately four billion mail item images (letters, flats and parcels) per year at its RECs. The RECs receive an image of the mail item and this image is displayed on one (or more) terminals for destination address resolution.

The cost to operate the national RECs is over one hundred million dollars per year. If the REC cannot resolve the image, the mail item is rejected by automation and then directed to manual operations at an added cost factor of ten to one for manual versus automated mail. After processing, the mail item is sent to a destination delivery unit (DDU), which is the final postal facility at which a mailpiece arrives prior to being delivered to the addressee. Local post offices are DDUs. The DDUs are each supplied from a Processing and Distribution Center (P&DC). There are approximately 250 such centers across the United States, which sort mail for a given region (typically a radius of around 200 miles) and connect with the national network for interregional mail.

Disclosed embodiments include systems and methods that implement a "virtual REC" and provide distributed image processing capability at local destination delivery units, or processing and distribution centers, or other local or regional facility to take advantage of the geographic and other knowledge of local employees/operators.

Various embodiments replace and improve on REC centralized processing by redistribution of the images using virtualization to local facilities. The images are processed by employees with personal knowledge of their service area. Embodiments include processes for supplementing address databases and commercial databases with the information derived from the local address processing.

FIG. 1 depicts a block diagram of a data processing system in which an embodiment can be implemented, for example as one of the local or central systems or servers described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing or imaging facility.

Various embodiments can eliminate the centralized RECs by redistributing the "images" to other facilities such as USPS DDUs or P&DCs. Currently there are more than 10,000 DDUs throughout the United States, each of which serve a specific P&DC. Of course, the advantages achieved by embodiments described herein can be obtained by any public private carrier, by distributing data acquisition to local facilities where employee familiarity with the area can aid in more accurate address resolution. As used herein and unless otherwise specified, "local delivery unit" will refer to a local delivery hub for any public or private letter or parcel delivery service, including the United States Postal Service and private couriers such as Federal Express, DHL, UPS, and others. The delivery unit can be, for example, a USPS DDU or the local delivery hub of a private courier, such as the point where the local delivery trucks are loaded and dispatched. In various embodiments, more-local delivery units are preferred, such as where the destination addresses are within a radius of 5, 10, or 20 miles of the delivery unit, but the embodiments described herein can apply to more "regional" delivery units with a broader radius or area of destination addresses. Preferably, the local delivery unit is the delivery unit geographically nearest the mail items (and addresses) being processed as described herein.

Figure 2:
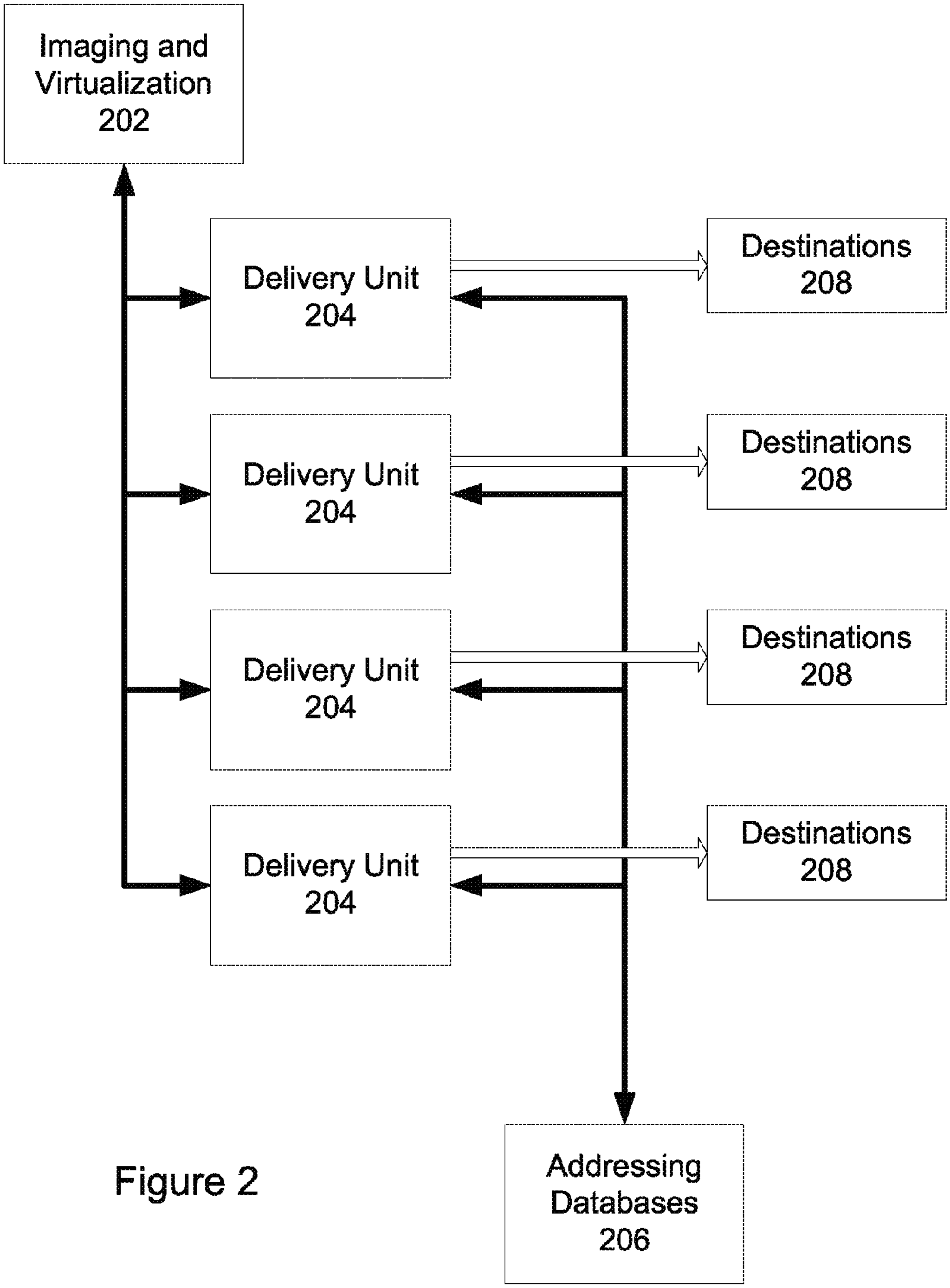
FIG. 2 illustrates a high level overview of the processes in accordance with disclosed embodiments.

FIG. 2 illustrates a high level overview of the processes in accordance with disclosed embodiments. These processes can apply to any mail items (letters, flats or parcels). Various disclosed embodiments also provide a level of security by limiting personnel having access to such information and the routing of mail items only at the trusted delivery unit, in particular cases by using the screen virtualization techniques described herein.

In this Figure, the mail items are processed at the IVF 202. In some embodiments, this facility is a USPS PD&C. In various embodiments, this facility includes one or more data processing systems 100, along with scanners, sorters, imagers, and other conventional processing equipment for mail items. The various systems described herein can each be implemented using one or more data processing systems 100, modified where necessary to include additional conventional mail processing hardware, and can communicate with each other over a network. Mail, mailpiece, and "mail item" are intended to refer to any letter, flat, or parcel to be delivered by the USPS or private courier.

IVF 202 performs mail processing and sorting operations, including in particular imaging the mail items and an initial sort of the items to the delivery units (DUs) 204. In some embodiments, the destination delivery units 204 correspond to specific ZIP codes, and so as long as most or all of a five-digit ZIP code can be recognized, the mail items can be sent to the appropriate delivery unit 204, and the virtualization processes described herein can send images to the correct delivery unit 204.

The mail items are transferred to the appropriate delivery units 204.

The IVF 202 also sends images of the respective mail items to the identified delivery units 204. This can occur at the same time, before, or after the physical mail items are delivered to the delivery units 204. In some cases, the images are not sent as separate objects or files, but are transmitted in a real-time virtualization environment to be displayed to a user on a system at the delivery unit 204. Such a virtualization environment can be implemented using known remote graphics software techniques such as those used in commercial desktop-virtualization products including "PCAnywhere", "LogMeIn", "GoToMyPC", or the "remote desktop" applications provided with commercial operating systems. Because such virtualization uses image compression and does not send the images as separate files, it can be more secure and efficient than transmitting the large original images of the mail items.

There would also be a significant reduction in actual transmission traffic because the rendered image would be compressed and transmitted which contains much less data then an actual image. Existing REC terminals can be re-instituted for this purpose.

Users at the delivery units analyze the images and key in address information, which is received by the system. An important advantage of performing this process at the local delivery unit is that the local user will have personal knowledge (PK) and other first-hand expertise about the surrounding area. For example, the local user will be able to recognize a neighborhood name that is mistakenly used in place of the name of a suburb, and can correct the data as it is being entered.

The mail items are further sorted at the delivery unit 204 according to the entered data. The mail items are delivered to their intended destinations 208. The entered data relating to the mail pieces is transmitted to addressing databases 206, and used to update these databases. In this way, corrections made possible by the local PK can be used to update the relevant databases for improved operations of the system as a whole.

In some cases, the addressing databases can include the USPS ZIP+4 databases, the USPS Address Management System databases, and/or the USPS Permanent Change of Address databases. In this way, the various addressing databases "learn" from the local user's PK-based data entry and corrections.

The virtualization of the REC image review and data-entry operations also allows the REC facilities to be downsized or eliminated, since its operations are not distributed to the various delivery units. This can save the overhead associated with operating a REC (or super REC) with supervisor overhead, building leases, and, to some extent, the specialized labor assigned to the RECs.

To assist in the processes described herein, each of the mail items can be associated and/or marked with a unique identifier. A mail item record can be used in association with the unique ID, so that the mail item, identifier, mad item record, associated images, and data entered according to the images can always be associated with each other.

Various embodiments can use the existing USPS managed network system (MNS) network to virtualize the mail item images to the delivery units. For example, the MNS network is already available and terminals are utilized at the DU for Change Of Address Record Verification.

Various embodiments can also achieve cost reductions and efficiencies in payroll by using the current delivery unity employees to key the mail items during their shift. These employees have personal knowledge of their service area and would be able to correct and finalize images that could not be finalized by a REC operator without PK. The personal knowledge can include street alias, prestige city names or areas (such as the City of Highland Park surrounded by Dallas) as well as new neighborhoods, residential areas (such as the Parks) and actual residents.

According to various embodiments, the system will route images to the responsible delivery unit whenever possible, either by sending the image files or preferably using virtualization techniques. In a USPS system, a significant amount of the images are resolved at the P&DC to something less than the resolution required for delivery or carrier route sorting. However, a five digit ZIP code result is enough pre-knowledge to route the image of the mail item to the responsible delivery unit, and the users there would have the personal knowledge needed to properly identify and resolve the image. In a USPS ZIP code, the three-digit prefix designates the destination Sectional Center Facility (SCF), which is often the P&DC. The remaining images would be distributed amongst all the DUs associated with that IVF 202, for example at a USPS P&DC, which may service some 100 DUs per P&DC.

As described herein, specialized data entry allows the knowledgeable operator at the local delivery unit to use personal knowledge of residence names, carrier routes, and house numbers to finalize the mail item image. This would allow images to be finalized and stay in automation when the Address Management System database (AMS) has missing or erroneous information.

Current USPS keying operators are limited in the possible keying operations to simple extraction and "Key-All" rules established over 20 years ago. Various embodiments include keying rules that are enhanced to include different access methods into the database (such as carrier and house number) to create different selection list not available to resolve the mail piece item in current systems.

In various USPS embodiments, the local users at the delivery unit can access to databases other than the AMS that are currently used for video coding today. Commercial databases as well as Proprietary Change of Address and National Change of Address databases can be utilized by the systems described herein. In this manner, the databases do not have to be distributed to each coding desk, and provides another layer of security for the systems and the databases themselves. Only employees with granted access would be able to log onto these systems.

Various embodiments can use the existing USPS DDU infrastructure as the delivery units described herein to eliminate RECS, taking advantage of facilities, networks, employees and specialized knowledge. Various embodiments use specialized personal knowledge of local users to supplement the current Address Management system utilizing the learning directory concept.

Figure 3:
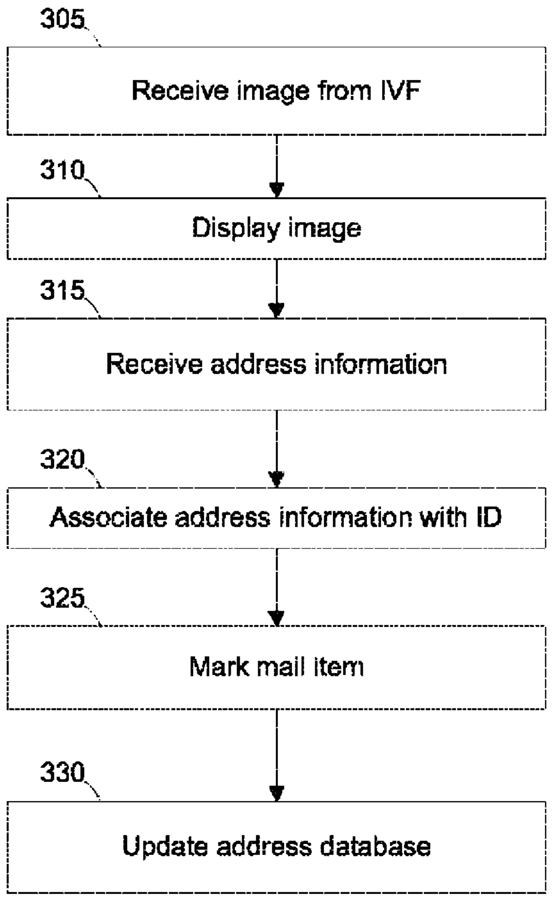
FIGS. 3 and 4 depict flowcharts of processes in accordance with disclosed embodiments.

FIG. 3 depicts a flowchart of a process in accordance with disclosed embodiments. In the processes described herein, various steps may be omitted, repeated, performed sequentially or concurrently, or performed in a different order, or performed as part of separately-described processes, unless otherwise specified. Various embodiments can include combining various steps from different exemplary processes disclosed herein.

The process of FIG. 3 is performed by a data processing system (which can include a plurality of data processing systems acting together) at a local delivery unit.

The data processing system at a local delivery unit receives an image of a mail item from an imaging and virtualization facility (step 305). In a preferred case, the local delivery unit is geographically remote from the IVF, and the mail item is addressed to be delivered by the delivery unit. In preferred embodiments, the image is received as part of a virtualized environment controlled by a system at the IVF, and the image is associated with a unique mail item identifier that is also associated with the mail item.

The data processing system displays the image to a user at the local delivery unit (step 310). In various embodiments, the image is displayed by the data processing system in the virtualized environment controlled by the system at the IVF.

The data processing system receives address information from the user, corresponding to a destination address on the mail item (step 315). The address information can be determined based on the user's personal knowledge of the geographic area of the local delivery unit.

The data processing system associates the address information with the mail item identifier (step 320).

The data processing system can mark the mail item with an indicia corresponding to the address information (step 325). The indicia can be an address label, barcode, or otherwise. The mail item can then be delivered using the indicia. In other embodiments, this step can be performed by a system at the IVF.

The address information is sent to an addressing database that is geographically remote from the local delivery unit (step 330). In some cases, the address information is sent by the data processing system at the local delivery unit, and in other cases, the address information is returned to the IVF in the virtualized environment, and is sent from the IVF to the addressing database.

Figure 4:
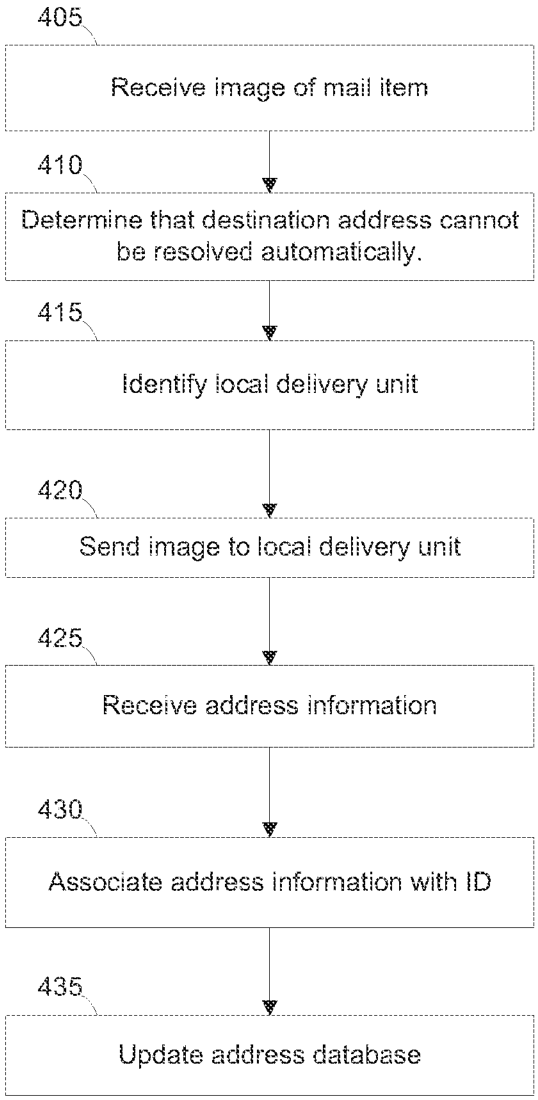

FIG. 4 depicts a flowchart of another process in accordance with disclosed embodiments. The process of FIG. 4 is performed by a data processing system (which can include a plurality of data processing systems acting together) at an imaging and virtualization facility.

The data processing system at the IVF receives an image of a mail item (step 405). This can be performed by imaging the mail item at the IVF.

The data processing system determines that a destination address on the mail item cannot be automatically determined in full (step 410).

The data processing system identifies a local delivery unit corresponding to the destination address (step 415). The local delivery unit can be geographically remote from the IVF. The mail item is addressed to be delivered by the delivery unit.

The data processing system sends the image to a system at the local delivery unit (step 420). In preferred embodiment, the image is sent as part of a virtualized environment controlled by the data processing system at the IVF.

The data processing system receives address information for the mail item from a user at the local delivery unit, corresponding to a destination address on the mail item (step 425). The address information can be based on the user's personal knowledge of the geographic area of the local delivery unit. In some embodiments, the address information is received in the virtualized environment controlled by the data processing system.

The data processing system associates the address information with a mail item identifier that is associated with the mail item (step 430).

The address information is sent to an addressing database that is geographically remote from the local delivery unit (step 435). In some cases, the address information is sent by the system at the local delivery unit, and in other cases, the address information is returned to the IVF in the virtualized environment, and is sent from the IVF to the addressing database.

Those skilled in the art will recognize that, for simplicity and clarity, the full structure and operation of all systems suitable for use with the present disclosure is not being depicted or described herein. Instead, only so much of the physical systems as is unique to the present disclosure or is necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as ROMs or EEPROMs, and user-recordable type mediums such as floppy disks, hard disk drives and CD-ROMs or DVDs. In particular, computer readable mediums can include transitory and non-transitory mediums, unless otherwise limited in the claims appended hereto. In particular, various embodiments include machine-readable mediums encoded with executable instructions that, when executed, cause one or more data processing systems to together perform processes as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A mail processing method performed by one or more data processing systems at a local delivery unit, comprising:
- receiving an image of a mail item at the local delivery unit from an imaging and virtualization facility (IVF) that is geographically separated from the local delivery unit, the image and the mail item associated with a mail item identifier, wherein the local delivery unit is a delivery unit geographically nearest to a destination of the mail item;
- displaying the image to a user at the local delivery unit;
- receiving address information corresponding to the mail item from the user; and
- associating the address information with the mail item identifier.

2. The method of claim 1, wherein the address information is based at least in part on the user's personal knowledge of the geographic area.

3. The method of claim 1, further comprising sending the address information to an addressing database that is geographically remote from the local delivery unit.

4. The method of claim 1, further comprising marking the mail item with an indicia corresponding to the address information.

5. The method of claim 1, wherein the image is received as part of a virtualization environment controlled by a system at the IVF.

6. A plurality of data processing systems at a local delivery unit, each comprising:

a processor; and an accessible memory, the data processing systems configured to together perform the steps of receiving an image of a mail item at the local delivery unit from an imaging and virtualization facility (IVF) that is geographically separated from the local delivery unit, the image and the mail item associated with a mail item identifier, wherein the local delivery unit is a delivery unit geographically nearest to a destination of the mail item;

displaying the image to a user at the local delivery unit;

receiving address information corresponding to the mail item from the user; and associating the address information with the mail item identifier.

7. The data processing systems of claim 6, wherein the address information is based at least in part on the user's personal knowledge of the geographic area.

8. The data processing systems of claim 6, further configured to perform the step of sending the address information to an addressing database that is geographically remote from the local delivery unit.

9. The data processing systems of claim 6, further configured to perform the step of marking the mail item with an indicia corresponding to the address information.

10. The data processing systems of claim 6, wherein the image is received as part of a virtualization environment controlled by a system at the IVF.

11. A non-transitory machine-readable medium encoded with executable instructions that, when executed, cause a data processing system at a local delivery unit to perform the steps of:
- receiving an image of a mail item at the local delivery unit from an imaging and virtualization facility (IVF) that is geographically separated from the local delivery unit, the image and the mail item associated with a mail item identifier, wherein the local delivery unit is a delivery unit geographically nearest to a destination of the mail item;
- displaying the image to a user at the local delivery unit;
- receiving address information corresponding to the mail item from the user; and
- associating the address information with the mail item identifier.

12. The machine-readable medium of claim 11, wherein the address information is based at least in part on the user's personal knowledge of the geographic area.

13. The machine-readable medium of claim 11, further comprising instructions for sending the address information to an addressing database that is geographically remote from the local delivery unit.

14. The machine-readable medium of claim 11, further comprising instructions for marking the mail item with an indicia corresponding to the address information.

15. The machine-readable medium of claim 11, wherein the image is received as part of a virtualization environment controlled by a system at the IVF.

16. A mail processing method performed by one or more data processing systems at an imaging and virtualization facility (IVF), comprising:
- receiving an image of a mail item;
- determining that a destination address of the mail item cannot be fully determined automatically;
- identifying a destination local delivery unit corresponding to the mail item, wherein the destination local delivery unit is a delivery unit geographically nearest to a destination of the mail item;
- sending an image of a mail item to the local delivery unit, the IVF being geographically separated from the local delivery unit, the image and the mail item associated with a mail item identifier;
- receiving address information corresponding to the mail item from the local delivery unit; and
- associating the address information with the mail item identifier.

17. The method of claim 1, wherein the address information is based at least in part on the personal knowledge of the geographic area of a user at the local delivery unit.

18. The method of claim 1, further comprising sending the address information to an addressing database that is geographically remote from the local delivery unit and the IVF.

19. The method of claim 1, further comprising marking the mail item with an indicia corresponding to the address information.

20. The method of claim 1, wherein the image is sent to the local delivery unit as part of a virtualization environment controlled by the data processing system at the IVF.

* * * * *